(12) United States Patent
Madec et al.

(10) Patent No.: US 11,528,123 B2
(45) Date of Patent: Dec. 13, 2022

(54) COMPUTING DEVICE PROCESSING EXPANDED DATA

(71) Applicant: Thales Dis France SA, Meudon (FR)

(72) Inventors: Steven Madec, Meudon (FR); David Vigilant, Meudon (FR)

(73) Assignee: THALES DIS FRANCE SAS, Meudon (FR)

( * ) Notice: Subject to any disclaimer, the term of this patent is extended or adjusted under 35 U.S.C. 154(b) by 333 days.

(21) Appl. No.: 16/625,529

(22) PCT Filed: Jun. 20, 2018

(86) PCT No.: PCT/EP2018/066487
§ 371 (c)(1),
(2) Date: Dec. 20, 2019

(87) PCT Pub. No.: WO2018/234415
PCT Pub. Date: Dec. 27, 2018

(65) Prior Publication Data
US 2021/0367754 A1    Nov. 25, 2021

(30) Foreign Application Priority Data
Jun. 22, 2017 (EP) .................................... 17305776

(51) Int. Cl.
  *H04L 9/08* (2006.01)
  *H04L 9/00* (2022.01)
  *G06F 13/40* (2006.01)
(52) U.S. Cl.
  CPC .......... *H04L 9/002* (2013.01); *G06F 13/4009* (2013.01); *H04L 9/0869* (2013.01); *H04L 2209/046* (2013.01); *H04L 2209/08* (2013.01)
(58) Field of Classification Search
  CPC . H04L 9/002; H04L 9/0869; H04L 2209/046; H04L 2209/16; H04L 2209/08;
(Continued)

(56) References Cited

U.S. PATENT DOCUMENTS 6,288,654 B1 * 9/2001 Kondo .................... G06T 9/005
                                                                    341/60
7,500,112 B1 * 3/2009 Wille ...................... H04L 9/003
                                                                    713/340
(Continued)

OTHER PUBLICATIONS

PCT/EP2018/066487, International Search Report, dated Aug. 28, 2018, European Patent Office, P.B 5818 Patentlaan 2 NL—2280 HV Rijswijk.
(Continued)

*Primary Examiner* — David Garcia Cervetti
(74) *Attorney, Agent, or Firm* — The Jansson Firm; Pehr B. Jansson

(57) ABSTRACT

The present invention relates to a computing device for executing a first cryptographic operation of a cryptographic process on useful input data, said computing device comprising a first processor, a second processor and a selection circuit wherein: —said selection circuit is configured: —for receiving, from an input bus, expanded input data obtained by interleaving dummy input data with said useful input data, —for determining positions of the dummy input data in said expanded input data, —and for extracting said dummy input data and said useful input data from the expanded input data based on said determined positions, —said first processor is configured for executing said first cryptographic operation of said cryptographic process on said extracted useful input data to obtain useful output data, —said second processor is configured for executing a second operation on said extracted dummy input data to obtain dummy output data, said computing device being configured for having said operations executed such that leakage generated by said first cryptographic operation is jammed by leakage generated by the second operation.

15 Claims, 5 Drawing Sheets

(58) Field of Classification Search
CPC .............. H04L 2209/125; H04L 9/003; G06F 13/4009; H04K 3/825; G09C 1/00
See application file for complete search history.

(56) References Cited

U.S. PATENT DOCUMENTS

| | | | | |
|---|---|---|---|---|
| 7,984,305 | B2* | 7/2011 | Ochi | H04L 9/0625 380/30 |
| 10,678,707 | B2* | 6/2020 | Poeppelmann | G06F 21/755 |
| 10,819,502 | B2* | 10/2020 | Maghrebi | H04L 9/002 |
| 2003/0190155 | A1* | 10/2003 | Tsutsui | G11B 20/00086 386/268 |
| 2005/0177559 | A1* | 8/2005 | Nemoto | G06F 16/24 |
| 2006/0215703 | A1* | 9/2006 | Honda | G06F 13/4045 370/476 |
| 2008/0232581 | A1* | 9/2008 | Elbaz | H04L 9/065 380/42 |
| 2008/0276138 | A1* | 11/2008 | Flynn | H03M 13/6508 714/701 |
| 2009/0232306 | A1* | 9/2009 | Nakamura | H04L 9/14 380/255 |
| 2010/0095133 | A1* | 4/2010 | Peter | H04L 9/003 380/59 |
| 2011/0001607 | A1* | 1/2011 | Kamakura | G06V 40/1365 340/5.82 |
| 2011/0302404 | A1* | 12/2011 | Cohen | H04L 9/0637 713/150 |
| 2011/0311050 | A1* | 12/2011 | Tomaru | H04B 10/70 380/256 |
| 2012/0124393 | A1* | 5/2012 | Sethumadhavan | G06F 21/76 726/36 |
| 2012/0137208 | A1* | 5/2012 | Ito | H04N 1/32776 715/234 |
| 2012/0255030 | A1* | 10/2012 | Matsuo | H04L 9/085 726/26 |
| 2014/0192975 | A1* | 7/2014 | Hamilton | H04L 9/003 380/42 |
| 2014/0331062 | A1* | 11/2014 | Tewari | G06F 21/602 713/189 |
| 2016/0103626 | A1* | 4/2016 | Hars | G06F 3/0659 711/103 |
| 2017/0026169 | A1* | 1/2017 | Sugahara | H04L 9/0656 |
| 2018/0351743 | A1* | 12/2018 | Michiels | H04L 9/32 |
| 2021/0050313 | A1* | 2/2021 | Rietman | H01P 3/06 |
| 2021/0286902 | A1* | 9/2021 | Linge | G06F 21/72 |
| 2021/0360151 | A1* | 11/2021 | Mizuno | H04N 5/23227 |
| 2021/0397747 | A1* | 12/2021 | Moran | G06F 21/72 |

OTHER PUBLICATIONS

PCT/EP2018/066487, Written Opinion of the International Searching Authority, dated Aug. 28, 2018, European Patent Office, D-80298 Munich.

* cited by examiner

COMPUTING DEVICE PROCESSING EXPANDED DATA

FIELD OF THE INVENTION

The present invention relates to the field of cryptographic devices, and more particularly to cryptographic devices protected against side-channel attacks.

BACKGROUND OF THE INVENTION

Cryptographic algorithms are commonly used for ensuring the privacy of communications by encryption, for authentication or for generating a verifiable signature. An example of such algorithms is block cipher algorithms such as DES or AES, in which input bits of data to be encrypted or decrypted are processed by blocks.

The computing devices performing such algorithms, even when protected against tampering, may leak information about the operations they perform through their power consumption or some electromagnetic or photonic emissions. Such leakage may occur at various stages of the operations such as a memory access, a data transfer on a bus or during the computation itself of logical or arithmetic operations on the internal registers of a processor.

When such leakage is correlated to the data processed by a computing device, this data becomes open to side-channel attacks, based on an analysis of the power consumption or electromagnetic signature of the computing device, as depicted on FIG. 1. A particular type of side-channel attack is Differential Power Analysis (DPA) that performs a statistical analysis of the power consumption and may be used to recover at least some part of a secret key used for encryption.

A commonly used countermeasure against side-channel attacks such as DPA is the masking of the intermediate values of an encryption process with a random mask. Nevertheless, such a masking may be defeated by an attacker by combining information from enough leakages.

Consequently, a different approach should be used for protecting cryptographic processes against side-channel attacks. Since the power consumption or electromagnetic signature analyzed in such attacks is driven by the hardware architecture of the computing device performing the process, there is a need for a computing device with a new hardware architecture whose power consumption or electromagnetic signature would not leak any information on sensitive data used in the cryptographic process, such as cryptographic keys.

SUMMARY OF THE INVENTION

For this purpose and according to a first aspect, this invention therefore relates to a computing device for executing a first cryptographic operation of a cryptographic process on useful input data,
said computing device comprising a first processor, a second processor and a selection circuit wherein:
said selection circuit is configured:
  for receiving, from an input bus, expanded input data obtained by interleaving dummy input data with said useful input data,
  for determining positions of the dummy input data in said expanded input data,
  and for extracting said dummy input data and said useful input data from the expanded input data based on said determined positions,
said first processor is configured for executing said first cryptographic operation of said cryptographic process on said extracted useful input data to obtain useful output data,
said second processor is configured for executing a second operation on said extracted dummy input data to obtain dummy output data,
said computing device being configured for having said operations executed such that leakage generated by said first cryptographic operation is jammed by leakage generated by the second operation.

Such an architecture enables to protect the first cryptographic operation and its input data against side channel analysis by hiding such input data in expanded data and by generating a jammed leakage.

The computing device according to the first aspect may be configured for having said first cryptographic operation and said second operation executed in parallel.

It enables to jam the leakage of the first processor during all the execution of the first operation.

Said first cryptographic operation may be a block cipher operation.

Said computing device may be among a computer, a smart card, a hardware security module and a system on chip.

According to a second aspect, the invention relates to a circuit arrangement comprising:
a computing device according to the first aspect,
an external expansion circuit,
said input bus configured for connecting said external expansion circuit and the selection circuit of said computing device,
wherein said external expansion circuit is configured for interleaving dummy input data with useful input data to obtain said expanded input data received by the selection circuit from said input bus, said dummy input data being uncorrelated with said useful input data.

Such an arrangement enables to produce expanded data, protected against side channel analysis, before transmitting it to the selection circuit of the computing device for performing a sensitive operation.

According to an embodiment of the invention, said computing device may comprise further an expansion circuit configured for interleaving said dummy output data with said useful output data to obtain expanded output data.
In this embodiment, said circuit arrangement comprises an external selection circuit and an output bus configured for connecting said computing device and said external selection circuit and said external selection circuit is configured:
for accessing, through said output bus, said expanded output data,
for determining positions of the dummy output data in said expanded output data,
and for extracting said useful output data from the expanded output data based on said determined positions.

Then said circuit arrangement is configured for using said useful output data in a subsequent operation of the cryptographic process or said circuit arrangement comprises an external memory and is configured for storing said useful output data in said external memory as result of the cryptographic process.

Such an embodiment enables to output expanded, protected, data from the computing device and to unexpand it later when such data is not sensitive anymore, for example for using it in other non-sensitive operations.

In a first embodiment, determining positions of the dummy data in said expanded data comprises receiving said positions from said bus.

In that case, such positions may be any positions in the expanded data and the selection circuits do not need to know such positions in advance.

Said positions may be randomly generated positions.

That way, an attacker cannot guess easily the positions of the useful data in expanded data and such positions may be changed often.

In a second embodiment, said positions of the dummy data in said expanded data are predetermined and memorized by said computing device or by said external selection circuit.

In that case, transmitting the positions with the expanded data is not needed anymore, which prevents an attacker gaining access to expanded data from having knowledge of such positions.

The useful data, the dummy data, the expanded data are sequences of bits and said dummy data may be bit values randomly generated by the expansion circuit of the computing device or the external expansion circuit.

The useful data, the dummy data, the expanded data may be sequences of bits and said expansion circuits may be configured for interleaving dummy data with useful data to obtain expanded data using an insertion sequence and a positions random number such that for each bit in the positions random number with a first value, a bit of said expanded data is selected from the insertion sequence and for each bit in the positions random number with a second value, a bit of said expanded data is selected from the useful data.

Such an expansion method lowers the risk that an attacker gains knowledge of the positions of useful data in the expanded data, and still keeps having a limited cost.

Said expansion circuits may be configured for generating said insertion sequence randomly or for using a predetermined insertion sequence.

According to a third aspect, the invention relates also to a method for secure execution of a first cryptographic operation of a cryptographic process on useful input data performed by a computing device comprising a first processor, a second processor and a selection circuit, said method comprising:
receiving, by said selection circuit, from an input bus, expanded input data obtained by interleaving dummy input data with said useful input data,
determining, by said selection circuit, positions of the dummy input data in said expanded input data,
extracting, by said selection circuit, said dummy input data and said useful input data from the expanded input data based on determined positions,
executing by the first processor said first cryptographic operation of said cryptographic process on said extracted useful input data to obtain useful output data,
executing by the second processor a second operation on said extracted dummy input data to obtain dummy output data,
said operations being executed such that leakage generated by said first cryptographic operation is jammed by leakage generated by the second operation.

According to a fourth aspect, the invention relates to a computer program product directly loadable into the memory of at least one computer, comprising software code instructions for performing by a computer's processor the steps of the method according to the third aspect when said product is run on the computer.

To the accomplishment of the foregoing and related ends, one or more embodiments comprise the features hereinafter fully described and particularly pointed out in the claims.

BRIEF DESCRIPTION OF THE DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF EMBODIMENTS OF THE INVENTION

In the description detailed below, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The description detailed below is, therefore, not to be taken in a limiting sense, and the scope of the present invention is defined only by the appended claims, appropriately interpreted, along with the full range of equivalents to which the claims are entitled.

The invention aims at providing a new hardware architecture for a computing device performing cryptographic operations such as block cipher operations, and an associated method, such that these operations are protected against side-channel attacks.

Figure 1:
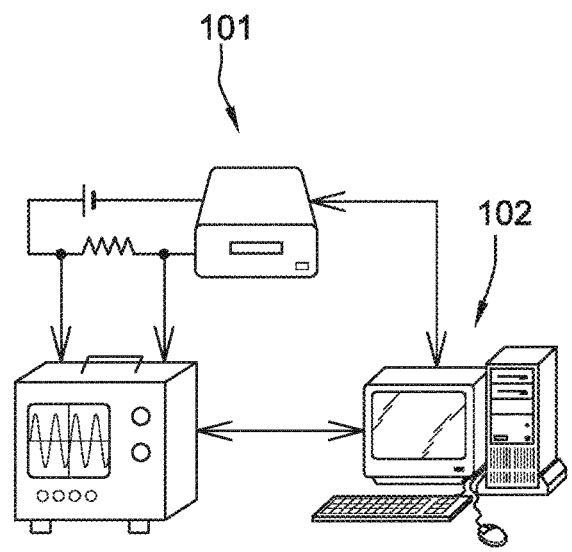
FIG. 1 is a schematic illustration of a system according to the present invention.

As depicted on FIG. 1, such a computing device 101, according to a first aspect of the invention, may be a stand-alone device connected to a personal computer or server 102 operated by a user and sending commands to the computing device for cryptographic operations such as data encryption or decryption using a block cipher algorithm such as the Advanced Encryption Standard (AES) algorithm, the Data Encryption Standard (DES), Blowfish, Serpent or Gost algorithms. Alternatively, the computing device 101 may be embedded in the computer 102.

The computing device 101 may be a tamper resistant device secured against any unauthorized access. The computing device 101 may for example be a smart card, a hardware security module or a system on a chip.

Figure 2:
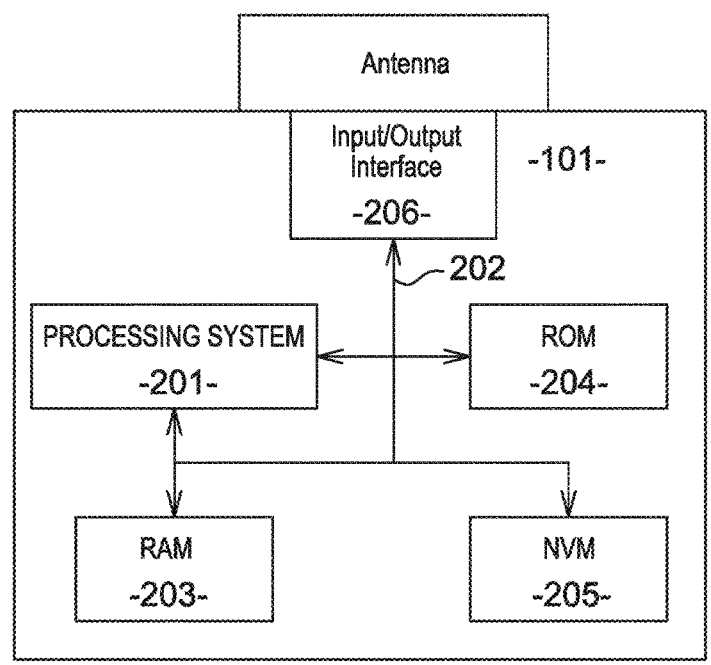
FIG. 2 is a schematic illustration of a computing device according to an embodiment of the present invention.

FIG. 2 is a schematic illustration of the computing device 101. The computing device 101 may include a processing system 201, connected via a bus 202 to a computer readable memory circuit including a random access memory (RAM) 203, a read-only memory (ROM) 204, and/or a non-volatile memory (NVM) 205. The computing device 101 may further include an interface 206 used to connect the computing device 101 to the computer 102. Such an interface may be either a wired interface such as a USB, Ethernet or Thunderbolt interface, or a wireless interface, such as a Bluetooth interface. The interface 206 may also be used to connect the computing device 101 to a wireless network, e.g., wide-area networks, WiFi networks, or mobile telephony networks through which communication may be performed with the computer 102.

Figure 3:
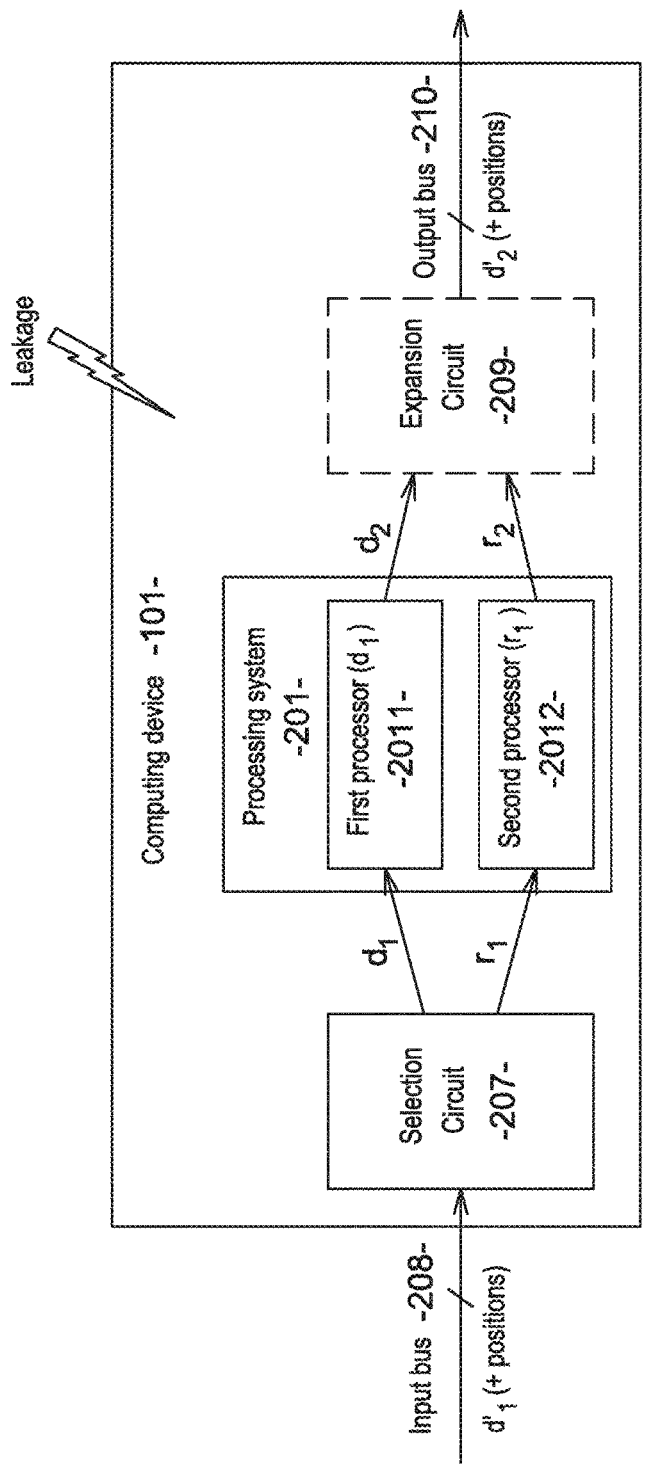
FIG. 3 is a schematic detailed illustration of a computing device according to an embodiment of the present invention.

In order to avoid leaking information about operations computed by the computing device when such operations are executed by the processing system 201, the processing system 201 includes a first processor 2011 and a second processor 2012, as depicted on FIG. 3. The first processor may be used for executing the cryptographic operations to be performed by the computing device, whereas the second processor may be used for executing other operations such that any leakage generated by the first processor is jammed by the leakage generated by the second processor. By doing so an attacker performing a side channel analysis attack would capture a global leakage from both processors and would not be able from that global leakage to isolate the leakage from the first processor only which bears information on sensitive operations performed by the computing device.

In order to achieve such a jamming, the second processor may perform operations on dummy data while the first processor performs operations on useful data.

In order to achieve a full protection of the computing device against side channel analysis, the architecture of the computing device shall also prevent leakage about the useful data used as input to the operations performed by the first processor. Such a leakage may for example occur during a transfer of these data on the bus 202 or when loading it from the computer readable memory circuit of the computing device.

In order to do so, the useful data to be used as input to the first processor may be stored in the memories and transferred on the buses of the computing device under an expanded format in which these useful data are interleaved with the dummy data used as input to the second processor. By doing so an attacker performing a side channel analysis on the computing device can only capture from the memories and buses leakages related to such expanded data. He would be incapable from such a leakage to isolate information on the sensitive useful data used as input to the first processor of the computing device.

In order to recover from such expanded data the useful data to be provided to the first processor, the computing device also includes a selection circuit 207 which receives from an input bus 208 such expanded input data, determines the respective positions of useful and dummy data in the expanded data, extracts the dummy input data and useful input data from the expanded input data based on said determined positions and transmits them to the first and second processors.

More precisely, as depicted on FIG. 3, the selection circuit 207 of the computing device executing a first cryptographic operation, such as block cipher operation, of a cryptographic process on useful input data $d_1$ may be configured:

for receiving, from the input bus 208, expanded input data $d_1'$ obtained by interleaving dummy input data $r_1$ with said useful input data $d_1$, for determining positions of the dummy input data $r_1$ in said expanded input data, for extracting said dummy input data $r_1$ and said useful input data $d_1$ from the expanded input data $d_1'$ based on said determined positions.

The first processor performs an access to the extracted useful input data $d_1$ and the second processor performs an access to the dummy input data $r_1$. A transmission of these two data could be performed simultaneously in order to prevent an attacker from obtaining the extracted useful input data $d_1$.

The first processor is configured for executing said first cryptographic operation of said cryptographic process on said extracted useful input data $d_1$ to obtain useful output data $d_2$.

The second processor is configured for executing a second operation on said extracted dummy input data $r_1$ to obtain dummy output data $r_2$ and the computing device is configured for having said operations executed such that leakage generated by said first operation is jammed by leakage generated by the second operation.

The dummy input data shall be uncorrelated with said useful input data. The leakage produced by the execution of the second operation may then be seen as noise added to the leakage from the first processor which is the signal of interest to the attacker. Performing the second operation lowers the Signal to Noise Ratio SNR of the global leakage, making it impossible for an attacker to retrieve from the global leakage information on the useful input data $d_1$ only. In other words, the computing device is configured for having a global leakage depending more on the power signature or electromagnetic emission generated by the dummy input data than one generated by the useful input data. Thus the useful input data cannot be retrieved from the global leakage. The computing device may be configured for having said first cryptographic operation and said second operation executed in parallel in order to have both leakages emitted almost at the same time. Alternatively the second operation may be executed only during one or more parts of the execution of the first cryptographic operation.

Figure 4:
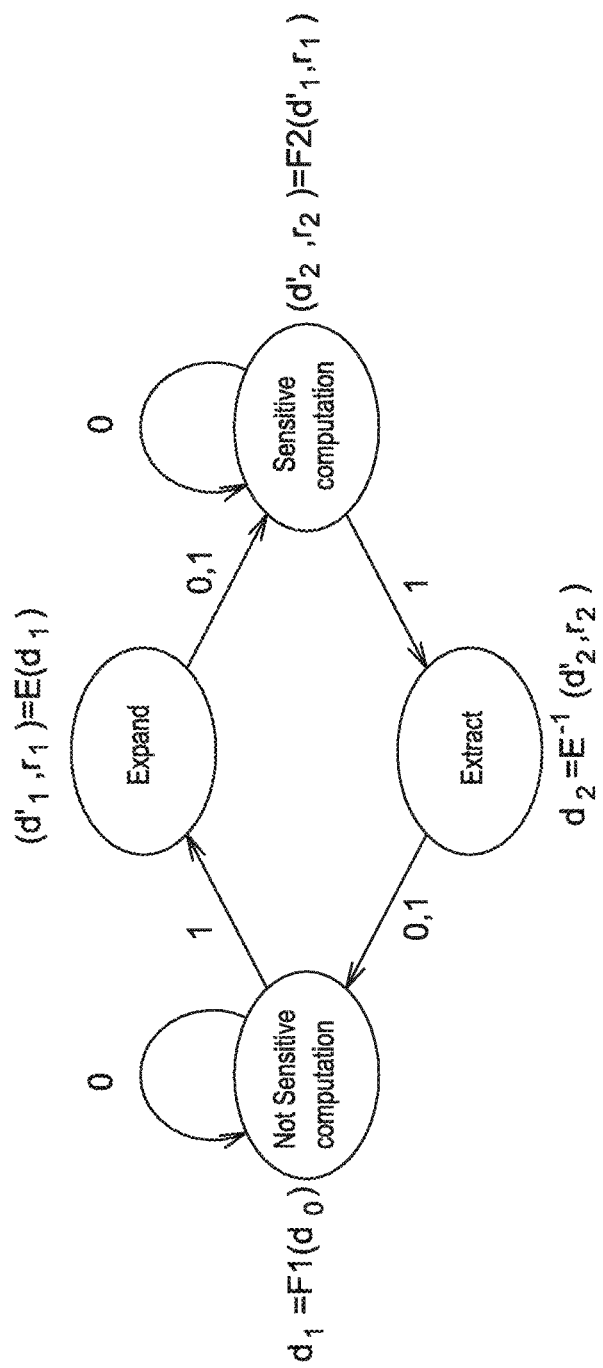
FIG. 4 is a schematic illustration of the processing of sensitive and non-sensitive operations according to the invention.

Before being stored in memory or provided to the selection circuit of the computing device, expanded input data shall be generated from useful data and dummy data. As shown on FIG. 4, operations that are not sensitive such as F1 on FIG. 4 may be performed on unprotected data $d_0$. In order to prevent any leakage to an attacker, resulting useful data $d_1$ shall then be protected by using an expansion operation E generating expanded data $d_1'$ before performing any sensitive operation such as F2. After such sensitive operations have been performed and data $d_2$ outputted by such operations may be revealed without risk to an attacker, useful data $d_2$ may be extracted from expanded data $d_2'$ by applying an inverse operation $E^{-1}$ in order to perform subsequent not-sensitive operations.

Figure 5:
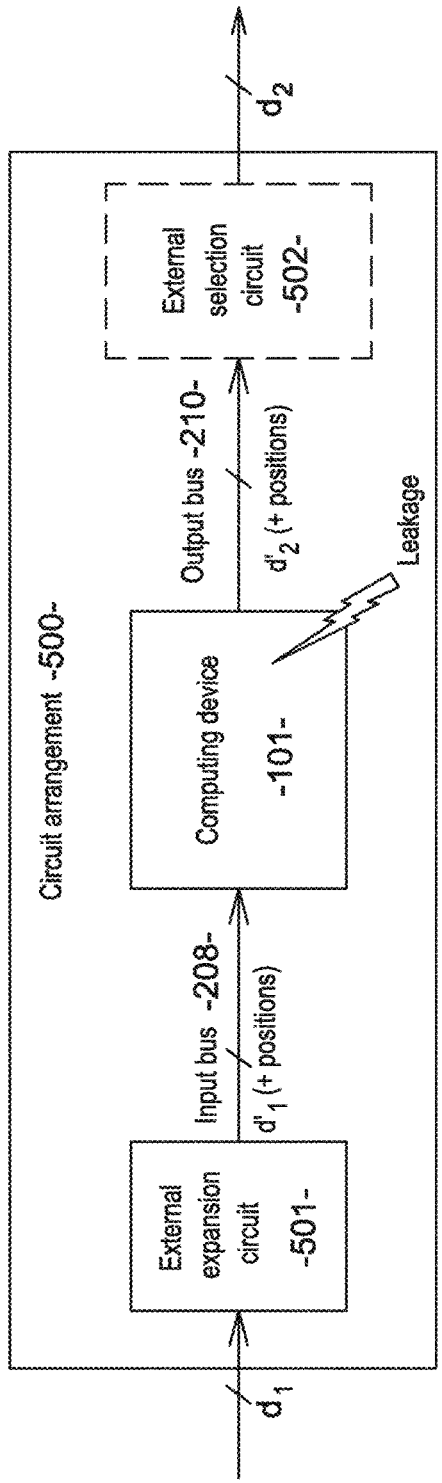
FIG. 5 is a schematic illustration of a circuit arrangement according to an embodiment of the present invention.

In a first embodiment, according to a second aspect of the invention, the computing device is included in a circuit arrangement 500 shown on FIG. 5 also including:

an external expansion circuit 501, said input bus 208 configured for connecting said external expansion circuit 501 and the selection circuit 207 of said computing device 101, The external expansion circuit is configured for interleaving dummy input data $r_1$ with useful input data $d_1$ to obtain said expanded input data $d_1'$ received by the selection circuit from said input bus 208, such that said dummy input data is uncorrelated with said useful input data.

As shown on FIG. 5, the external expansion circuit may be external to the computing device. Alternatively, it may be included in the computing device.

The useful output data $d_2$ generated by the first processor may not be sensitive data and may be outputted to other components of the circuit arrangement. Alternatively, they may be sensitive data, and shall then also be protected against side channel analysis. The computing device may then include an expansion circuit 209 configured for interleaving said dummy output data $r_2$ with said useful output data $d_2$ to obtain expanded output data $d'_2$ which may be stored in the memories of the computing device, further provided to the selection circuit for performing another operation, or outputted to other components of the circuit arrangement.

In order to remove dummy data from the expanded output data produced by the computing device, the circuit arrangement may also comprise an external selection circuit 502, and an output bus 210 configured for connecting said computing device 101 and said external selection circuit 502, and said external selection circuit may be configured:
- for accessing, through said output bus, said expanded output data $d'_2$,
- for determining positions of the dummy output data $r_2$ in said expanded output data $d'_2$,
- and for extracting said useful output data $d_2$ from the expanded output data $d'_2$ based on said determined positions.

The circuit arrangement may then be configured for using said useful output data $d_2$ in a subsequent operation of the cryptographic process. Alternatively the circuit arrangement may comprise an external memory and may be configured for storing the useful output data $d_2$ in this external memory as result of the cryptographic process.

Such an external memory may also be used for storing the input data $d_1$ or the expanded input data $d_1'$ when generated outside of the computing device, or the useful output data $d_2$ when outputted directly by the computing device, or the expanded output data $d_2'$.

In an alternative embodiment, the external selection circuit 502 may be included in the computing device itself.

The computing device may be configured for performing only sensitive operations on expanded data. For example, when the computing device is embedded in a computer 102, the elements of the circuit arrangement not included in the computing device may be part of said computer which may perform all non-sensitive operations.

Alternatively, the computing device may be configured for performing both sensitive and non-sensitive operations. It may then expand data before performing a sensitive operation and then unexpand it when output data are not sensitive data anymore.

Different options may be used in order to manage the position of the dummy data and/or the useful data in the expanded data.

In a first embodiment, the positions of the dummy data in said expanded data are predetermined and are memorized by said computing device for being accessible by said selection circuit of said computing device or by said external selection circuit.

Alternatively, such positions may be transmitted together with the expanded data. In that case, the selection circuit of the computing device and the external selection circuit are configured for receiving said positions from the input bus or the output bus in order to determine the positions of the dummy data in the expanded data. In such a case, said positions may be randomly generated positions.

The useful data, the dummy data, the expanded data may be sequences of bits and in both cases the dummy data may be bit values randomly generated by the expansion circuit of the computing device or the external expansion circuit.

Figure 6:
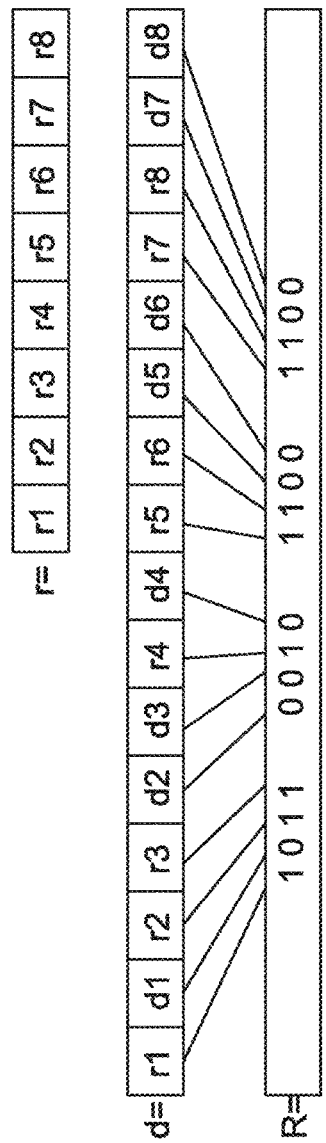
FIG. 6 is a schematic illustration of an option to manage the positions of the dummy data and/or the useful data in the expanded data according to the invention.

In order to randomly generate positions of dummy data in an expanded data, as depicted on FIG. 6, the expansion circuit of the computing device or the external expansion circuit may use an insertion sequence r and a positions random number R such that for each bit in the positions random number R with a first value, for example 1 on the example of FIG. 6, a bit of said expanded data d' is selected from the insertion sequence r and for each bit in the positions random number R with a second value, for example 0 on the example of FIG. 6, a bit of said expanded data d' is selected from the useful data d.

The expansion circuit of the computing device or the external expansion circuit may be configured for generating said insertion sequence r randomly or for using a predetermined insertion sequence r.

Figure 7:
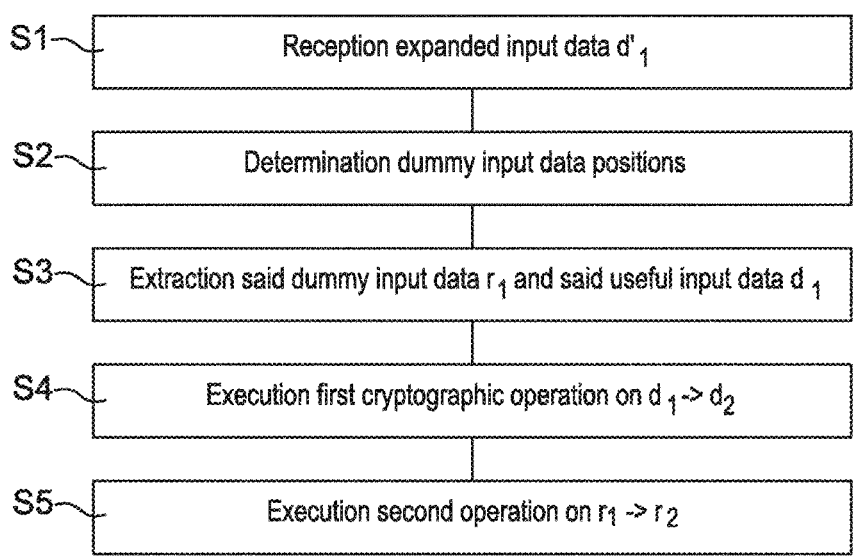
FIG. 7 illustrates a method according to an embodiment of the present invention.

The following paragraphs describe the steps of a method for secure execution of a first cryptographic operation of a cryptographic process on useful input data according to a third aspect of the invention as depicted on FIG. 7. These steps are performed by said computing device according to the first aspect of the invention comprising a first processor, a second processor, a selection circuit as descripted above.

In a first step S1, said selection circuit receives, from an input bus, expanded input data $d_1'$ obtained by interleaving dummy input $r_1$ data with said useful input data $d_1$.

In a second step S2, said selection circuit determines the positions of the dummy input data $r_1$ in said expanded input data $d_1'$.

In a third step S3, said selection circuit extracts said dummy input data $r_1$ and said useful input data $d_1$ from the expanded input data $d_1'$ based on the determined positions.

In a fourth step S4, said first processor executes said first cryptographic operation of said cryptographic process on said extracted useful input data $d_1$ to obtain useful output data $d_2$.

In a fifth step S5, said second processor executes a second operation on said extracted dummy input data $r_1$ to obtain dummy output data $r_2$.

Said operations are executed such that leakage generated by said first operation is jammed by leakage generated by the second operation.

In addition to these steps, the method according to the third aspect of the invention may comprise any other step corresponding to the operations, described here before, for which the circuit arrangement or its subcomponents are configured.

Finally, according to a fourth aspect of the invention, the invention relates to a computer program product directly loadable into the memory of at least one computer, comprising software code instructions for performing by a computer's processor the steps of the method according to the third aspect when said product is run on the computer.

As a result, using such a jamming of leakage during sensitive computations and using expanded data, such a computing device enables to protect any sensitive operation against side channel analysis attacks.

The invention claimed is:

1. An apparatus for performing cryptographic operations, comprising:
a computing device for executing a first cryptographic operation of a cryptographic process on a first input data;
said computing device having a first processor, a second processor and a selection circuit, wherein:
said selection circuit of said computing device is configured:
for receiving, from an input bus, expanded input data obtained by interleaving dummy input data with said first input data,
for determining positions of said dummy input data in said expanded input data;
and for extracting said dummy input data and said first input data from said expanded input data based on said determined positions;
said first processor is configured for executing said first cryptographic operation of said cryptographic process on said extracted first input data to obtain first output data;
said second processor is configured for executing a second operation, in parallel with said first processor executing said first cryptographic operation, on said extracted dummy input data to obtain dummy output data; and
an expansion circuit configured for interleaving said dummy output data with said first output data to obtain expanded output data,
whereby the computing device jams leakage from operations executed by said first cryptographic operation by leakage generated by said second operation;
an external expansion circuit, connected to said selection circuit of the computing device via an input bus; and
an external selection circuit connected via an output bus to said expansion circuit of the computing device;
wherein:
said external expansion circuit is configured for interleaving said dummy input data with said first input data to obtain said expanded input data received by the selection circuit from said input bus, said dummy input data being uncorrelated with said first input data;
said external selection circuit being configured:
for accessing, through said output bus, said expanded output data;
for determining positions of said dummy output data in said expanded output data; and
for extracting said first output data from said expanded output data based on said determined positions; and
wherein said computing device is configured for using said first output data in a subsequent operation of the cryptographic process or is configured for storing said first output data in an external memory as a result of the cryptographic process.

2. The apparatus of claim 1 wherein said first cryptographic operation is a block cipher operation.

3. The apparatus of claim 1 where said computing device is among a computer, a smart card, a hardware security module and a system on chip.

4. The apparatus of claim 1, wherein determining positions of said dummy data in said expanded data comprises receiving said positions from said bus.

5. The apparatus of claim 4, wherein said positions are randomly generated positions.

6. The apparatus of claim 1, wherein said positions of said dummy data in said expanded data are predetermined and stored in said computing device or by said external selection circuit.

7. The apparatus of claim 1, wherein said first input data, said dummy input data, said expanded input data are sequences of bits and wherein said dummy input data are bit values randomly generated by the expansion circuit of the computing device or the external expansion circuit.

8. The apparatus of claim 1, wherein said first input data, said dummy input data, said expanded input data are sequences of bits and wherein said expansion circuit of the computing device and said external expansion circuit are configured for interleaving said dummy input data with said first input data to obtain said expanded input data using an insertion sequence and a positions random number such that for each bit in said positions random number with a first value, a bit of said expanded data is selected from said insertion sequence and for each bit in said positions random number with a second value, a bit of said expanded data is selected from said first input data.

9. The apparatus of claim 8, wherein said expansion circuit of the computing device and said external expansion circuit are configured for generating said insertion sequence randomly or for using a predetermined insertion sequence.

10. The apparatus of claim 1, wherein determining positions of said dummy data in said expanded data comprises receiving said positions from said bus.

11. The apparatus of claim 10, wherein said positions are randomly generated positions.

12. The apparatus of claim 1, wherein said positions of said dummy data in said expanded data are predetermined and stored in said computing device or by said external selection circuit.

13. The apparatus of claim 1, wherein said first input data, said dummy input data, said expanded input data are sequences of bits and wherein said dummy data are bit values randomly generated by said expansion circuit of said computing device or said external expansion circuit.

14. The apparatus of claim 1, wherein said first input data, said dummy input data, said expanded input data are sequences of bits and wherein said expansion circuit and said external expansion circuits are configured for interleaving said dummy input data with said first input data to obtain said expanded input data using an insertion sequence and a positions random number such that for each bit in said positions random number with a first value, a bit of said expanded data is selected from said insertion sequence and for each bit in said positions random number with a second value, a bit of said expanded input data is selected from said first input data.

15. The apparatus of claim 14, wherein said expansion circuits are configured for generating said insertion sequence randomly or for using a predetermined insertion sequence.

* * * * *